United States Patent
York et al.

(10) Patent No.: US 6,847,138 B2
(45) Date of Patent: Jan. 25, 2005

(54) ALTERNATOR FIELD COIL WIRE ROUTING DESIGN

(75) Inventors: Michael Timothy York, Chelsea, MI (US); Anthony Militello, Ypsilanti, MI (US); Jeffrey Brabant, Britton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 173 days.

(21) Appl. No.: 10/202,772

(22) Filed: Jul. 25, 2002

(65) Prior Publication Data

US 2004/0017128 A1 Jan. 29, 2004

(51) Int. Cl.[7] .......................... H02K 3/51; H02K 13/02
(52) U.S. Cl. ..................... 310/71; 310/261; 310/263; 310/232; 29/598
(58) Field of Search .......................... 310/71, 189, 261, 310/263, 270; 29/598

(56) References Cited

U.S. PATENT DOCUMENTS

| | | | | |
|---|---|---|---|---|
| 3,184,625 A | * | 5/1965 | Farison | 310/59 |
| 3,230,404 A | * | 1/1966 | Graham | 310/51 |
| 3,271,604 A | * | 9/1966 | Priddy | 310/234 |
| 3,603,825 A | * | 9/1971 | Sheridan et al. | 310/194 |
| 3,671,906 A | * | 6/1972 | Hodges et al. | 336/208 |
| 3,969,645 A | | 7/1976 | Spotts et al. | |
| 4,565,936 A | * | 1/1986 | Ikegami et al. | 310/62 |
| 4,588,915 A | * | 5/1986 | Gold et al. | 310/194 |
| 5,254,896 A | * | 10/1993 | Bradfield et al. | 310/263 |
| 5,325,003 A | * | 6/1994 | Saval et al. | 310/43 |
| 5,329,199 A | | 7/1994 | Yockey et al. | |
| 5,886,447 A | | 3/1999 | Hatsios et al. | |
| 5,886,451 A | * | 3/1999 | Hatsios et al. | 310/263 |
| 5,892,313 A | | 4/1999 | Harris et al. | |
| 6,020,669 A | * | 2/2000 | Umeda et al. | 310/263 |
| 6,072,253 A | | 6/2000 | Harpenau et al. | |
| 6,114,786 A | * | 9/2000 | Ishida et al. | 310/71 |
| 6,172,434 B1 | * | 1/2001 | Oohashi et al. | 310/71 |
| 6,172,441 B1 | | 1/2001 | York et al. | |

FOREIGN PATENT DOCUMENTS

GB 2352093 1/2001

* cited by examiner

Primary Examiner—Thanh Lam
Assistant Examiner—David W. Scheuermann
(74) Attorney, Agent, or Firm—Brinks Hofer Gilson & Lione

(57) ABSTRACT

An alternator for a motor vehicle is disclosed. The alternator includes a stator having a stator winding, a rotor assembly positioned concentrically relative to the stator, and including at least one pole having an outer surface. The outer surface has a groove and includes a field coil disposed adjacent the at least one pole, the field coil having start and end leads. A slip ring is fixedly coupled to the start and end leads and a rotor shaft on which the field coil, the at least one pole and the slip ring are fixed. Moreover, the start and end leads are positioned within the groove and are retained in the groove by a locking feature formed in the outer surface of the at least one pole.

25 Claims, 5 Drawing Sheets

ALTERNATOR FIELD COIL WIRE ROUTING DESIGN

TECHNICAL FIELD

The present invention relates to electric machines having stators and rotors and to methods of assembling a field coil in the rotor.

BACKGROUND

One type of alternator for converting mechanical energy to electrical energy in today's vehicles includes a Lundel style rotor. Typically, the Lundel rotor includes two iron claw poles, a field coil winding wrapped onto a plastic bobbin and a shaft extending through the poles and field coil. The rotor is positioned concentrically with a stator. In operation the alternator produces an electrical output through the rotation of the rotor (acting as an electromagnet) relative to the stator. More specifically, an electrical current is induced in a stator winding by a change in the magnetic flux field present between the stator and the rotor.

One well known challenge with the Lundel rotor design is to create a durable method for routing the start and end leads of the field coil. More specifically, the integrity of the attachment of the field coil leads is compromised at high alternator speeds, such as speeds greater than 25000 rpms. While prior art methods for creating field coil lead routings have achieved their intended purpose and perform adequately at lower rpms (20,000 rpm) current routing schemes may not perform adequately at higher rpms. For example, one method requires the use of heat stakes in combination with epoxy and in combination with fan geometry or addition of slip ring geometry to contain the field coil leads. Unfortunately, this method requires excessive packaging space and doesn't provide adequate field coil lead retention at high rotor speeds.

Given that recent trends in the automotive industry have been to increase maximum engine speed requiring improved alternator maximum speed capability, a need exists for an improved alternator rotor which provides enhanced field coil lead retention. This need is further intensified by the additional requirements for increased power which have led to smaller alternator pulleys thus, further increasing the speed of the machine.

SUMMARY

The present invention overcomes the disadvantages of the prior art alternators by providing an improved alternator rotor for use in a motor vehicle. The alternator includes a stator having a stator winding, a rotor assembly positioned concentrically relative to the stator, and includes at least one pole having an outer surface. The outer surface has a radially extending groove and includes a field coil disposed adjacent to the at least one pole. The field coil has start and end leads. A slip ring rotor assembly is fixedly coupled to the start and end leads and a rotor shaft on which the field coil, the at least one pole and the slip ring assembly are fixed. Moreover, the start and end leads are positioned within the groove and are retained in the groove by a locking feature formed in the outer surface of the rotor.

In accordance with an embodiment of the present invention, the at least one pole is a claw pole configuration.

In accordance with another embodiment of the present invention, the alternator includes a retainer disposed within the groove for retaining the start and end leads within the groove. The retainer has a snap feature for capturing the start and end leads, and the start and end leads are covered with an insulating sleeve.

In accordance with yet another embodiment of the present invention, the insulating sleeve extends from an outer edge of the rotor surface to center of the rotor.

In accordance with yet another embodiment of the present invention, the start and end leads are welded to the slip ring assembly.

In accordance with yet another embodiment of the present invention, the locking feature is a swage.

In accordance with yet another embodiment of the present invention, a rotor for an alternator includes at least one pole having an outer surface. The outer surface has a radially extending groove and a field coil disposed adjacent the at least one pole, the field coil having start and end leads. A slip ring rotor assembly is fixedly coupled to the start and end leads and the rotor shaft on which the field coil, the at least one pole and the slip ring assembly are fixed. The start and end leads are positioned within the groove and are retained in the groove by a locking feature formed in the outer surface of the rotor.

These and other aspects and advantages of the present invention will become apparent upon reading the following detailed description of the invention in combination with the accompanying drawings.

DETAILED DESCRIPTION

Figure 1:
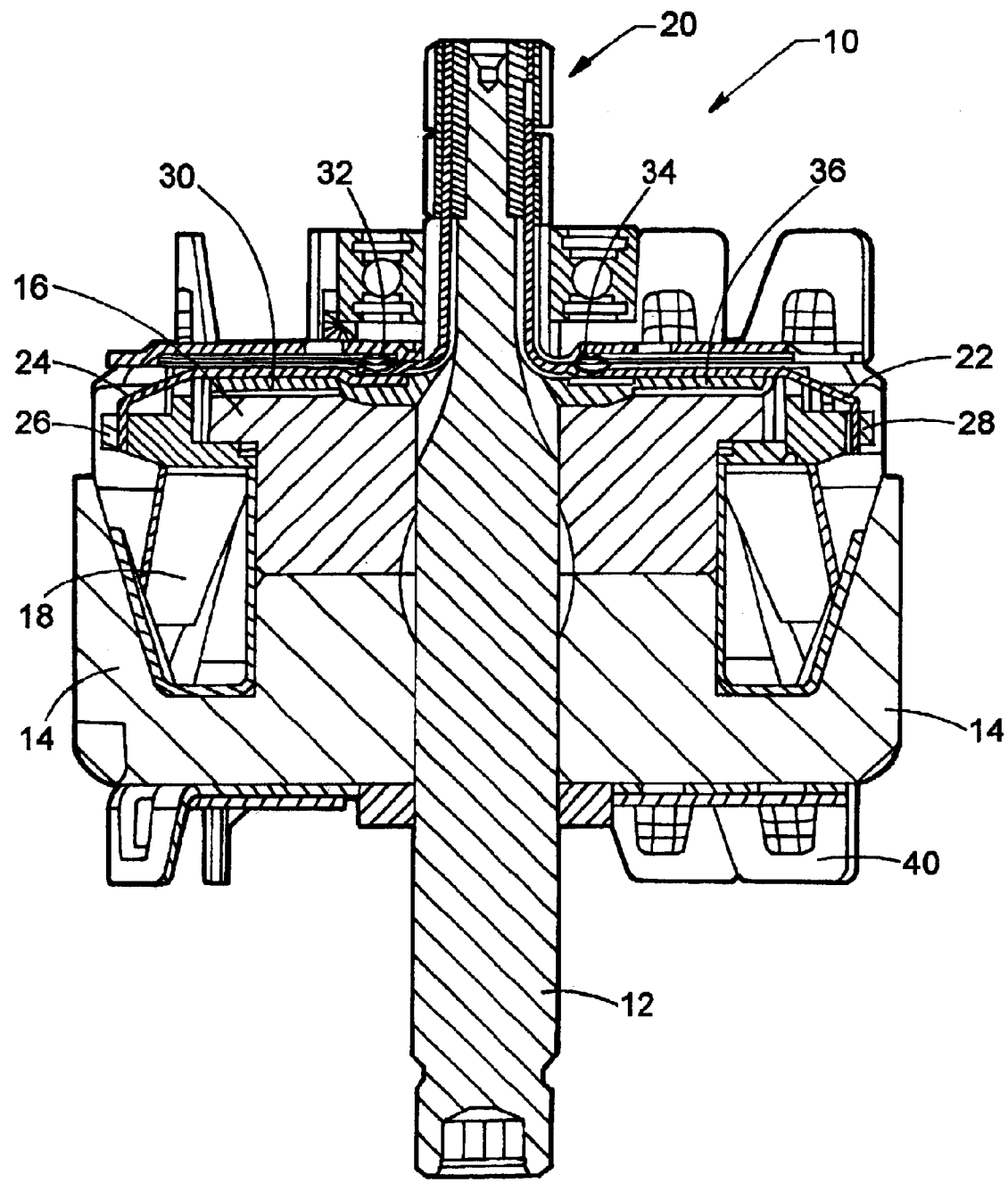
FIG. 1 is a cross-sectional view of a typical rotor.

Referring now to FIG. 1, a cross-sectional view of a typical (prior art) rotor 10 for use in a Lundel style alternator (not shown) is illustrated. Rotor 10 includes a rotor shaft 12 which is mechanically coupled for rotation to a vehicle engine. A first and second claw pole 14, 16 are rigidly affixed to shaft 12 and rotatable therewith. As well known in the art, a field coil 18 wound around a bobbin (not shown) is disposed between claw poles 14 and 16. Field coil 18 cooperates with claw poles 14 and 16 to produce an electromagnetic field that results in alternating magnetic polarities on the pole fingers.

Field coil 18 is energized by an electrical current communicated to the field coil through a rotor slip ring assembly 20. More specifically, in the prior art start and end leads 22 and 24 of field coil 18 are routed from the field coil to the rotor slip ring assembly 20. As illustrated, start and end leads 22 and 24 are mechanically secured to a pair of winding posts 26 and 28 where the leads are wound about the post and then routed along an outer surface 30 of claw pole 16. Further, the start and leads 22 and 24 are then heat staked to a pair of heat stakes 32 and 34 that are disposed on rotor slip ring assembly 20. A layer of epoxy 36 is further provided over top of leads 22 and 24 to retain the leads against surface 30 of claw pole 16. Still further, in rotor configurations having fans 38 and 40, fan 38 is positioned over top of start and end leads 22 and 24 capturing the leads between the fan and claw pole 16.

Figure 2:
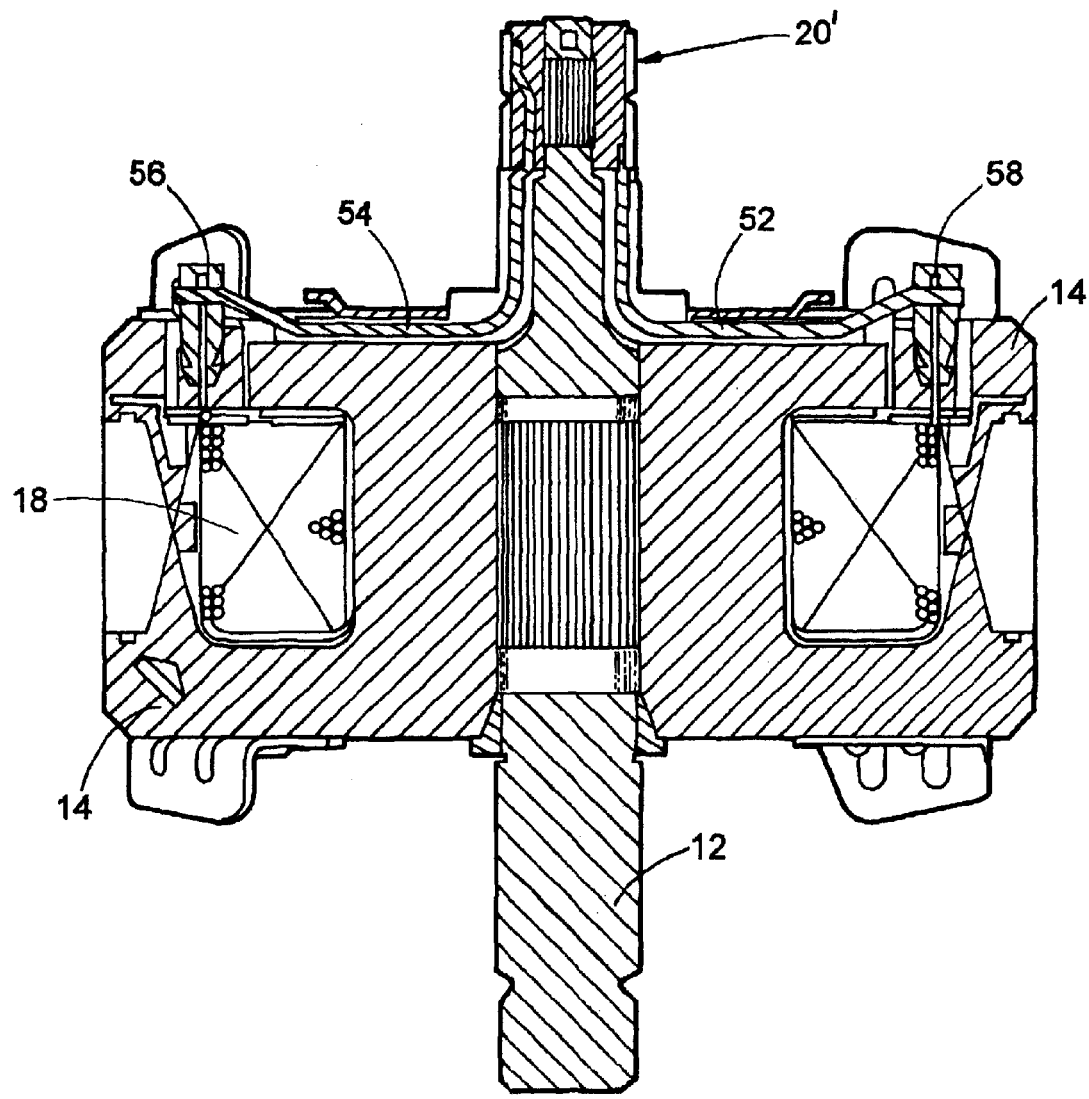
FIG. 2 is a cross-sectional view of a prior art alternator rotor illustrating a method for routing start and end leads of a field coil.

An alternative prior art method for routing start and end leads of field coil 18 is illustrated in FIG. 2. An alternate slip ring assembly 20' having radially extending arms 52 and 54 that extend radially to a pair of welding posts 56 and 58. The start and end leads of field coil 18 are routed to welding posts 56 and 58 the leads are welded to arms 52 and 54. In this manner, start and end leads of field coil 18 are mechanically and electrically coupled to slip ring rotor assembly 20'. While this prior art method for routing the field coil leads accomplishes its intended purpose, problems with this design still exist. For example, at high rotor speeds, the weld joints separate causing an open electrical circuit between the field coil and the slip ring assembly 20'.

Figure 3:
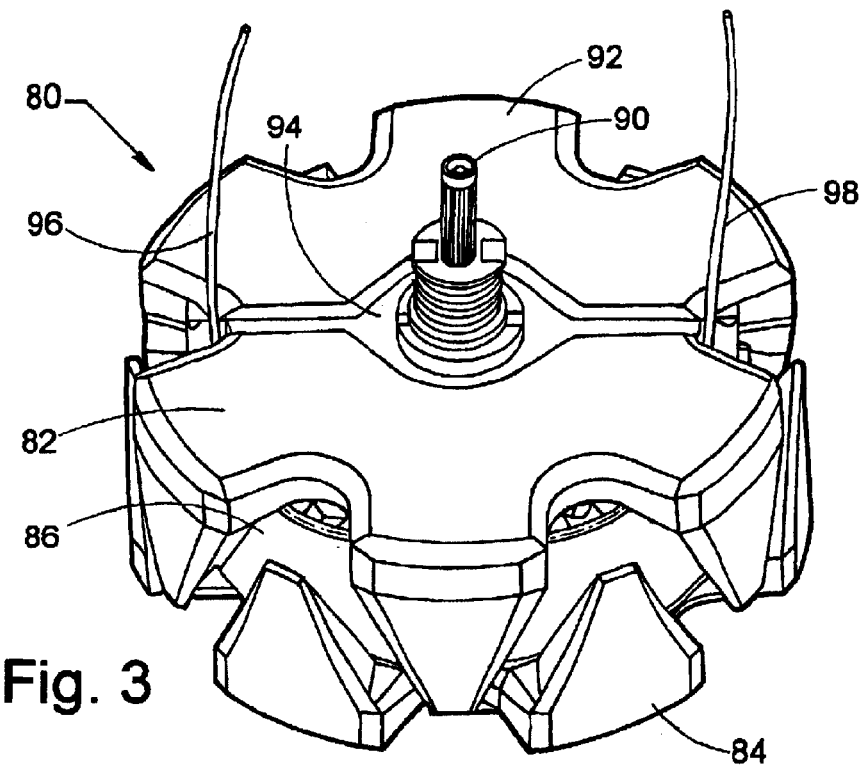
FIG. 3 is a top perspective view of an improved rotor assembly, in accordance with the present invention.

Referring now to FIG. 3, an improved rotor assembly 80 is illustrated, in accordance with the present invention. Rotor assembly 80 includes first and second claw poles 82 and 84, a field coil 86, and a rotor shaft 90. Field coil 86 is disposed between first and second claw poles 82 and 84 and includes a field coil winding wound around a bobbin (not shown). Field coil 86 and claw poles 82 and 84 cooperate to produce an electromagnet. An outer surface 92 of claw pole 82 includes a recess or groove 94 for receiving field coil start and end leads 96 and 98.

Figure 4:
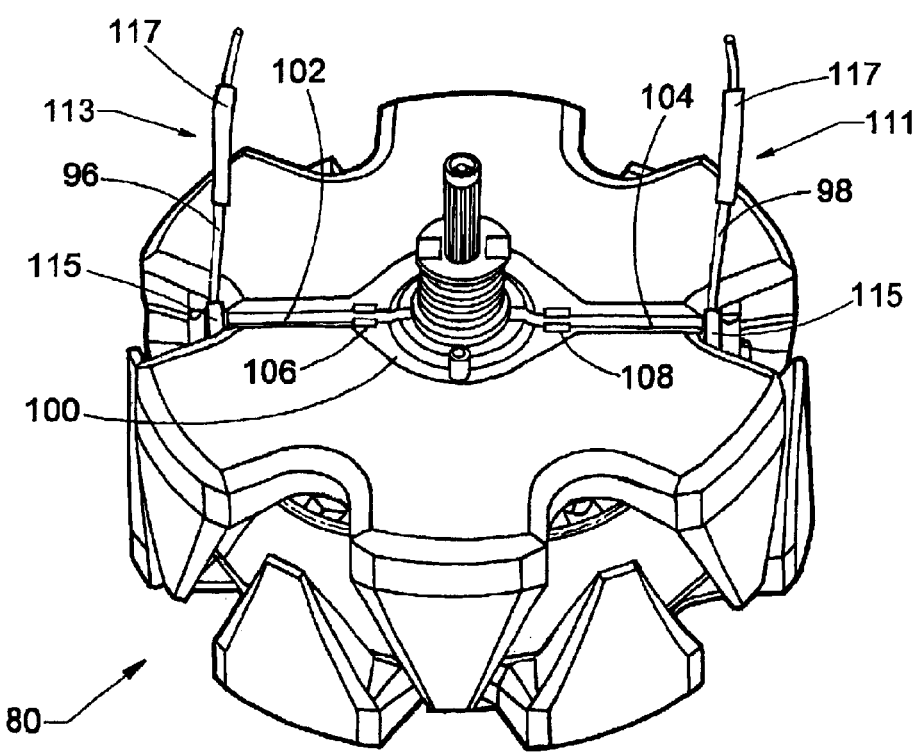
FIG. 4 is a top perspective view of an improved rotor assembly illustrating the assembly of the insulating sleeve over the field coil leads, in accordance with the present invention.

Referring now to FIG. 4, an improved rotor assembly 80 is further illustrated in greater detail disclosing a field coil lead retainer 100, in accordance with the present invention. Field coil lead retainer 100 is made of an electrically insulating material such as plastic and is appropriately sized to fit within groove 94. Retainer 100 further includes routing channels 102 and 104 for receiving start and end leads 96 and 98. Additionally, retainer 100 includes snap features 106 and 108 that are sized to create an interference fit with leads 96 and 98.

In an embodiment of the present invention, insulating sleeving 111 and 113 are provided. Sleeving 111 and 113 are placed over leads 96 and 98. Insulating sleeving 111 and 113 includes a first insulating portion 115 for providing an enhanced electrical insulating barrier between leads 96 and 98 and pole 82. First insulating portion 115 extends from the field coil to just inside retainer 100. Further, insulating sleeving 111 and 113 includes a second insulating portion 117 for electrically insulating the leads from rotor shaft 90. Second insulating portion 117 extends from retainer 100 up the rotor shaft and terminates at the slip ring assembly. Thus, this interrupted insulating sleeving configuration allows epoxy to be deposited over the bare leads (leads without sleeving) providing enhanced retainment of the leads.

Figure 5A:
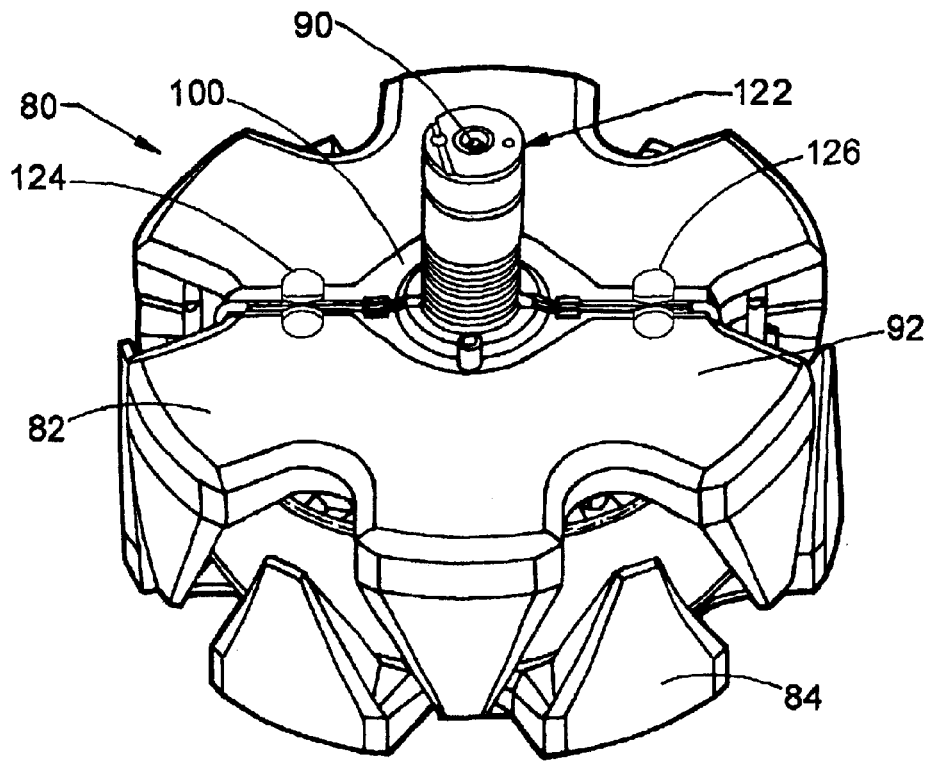
FIG. 5a is a top perspective view of an improved rotor assembly illustrating the attachment of the slip ring assembly to the rotor shaft, in accordance with the present invention.

Referring now to FIG. 5a, new and improved rotor assembly 80 is further illustrated with a slip ring assembly 120 mounted to rotor shaft 90. The slip ring assembly 120 may be a one piece or two piece design as known in the art. Start and ends leads 96 and 98 are routed through routing channels 102 and 104 and snapped into snap features 106 and 108 before they are fixedly attached to slip ring assembly 120. The start and end leads 96 and 98 may be welded to slip ring assembly 120. Of course, other methods of attaching leads 96 and 98 to slip ring 120 are contemplated such as soldering, heat staking, mechanical pinching, etc.

Figure 5B:
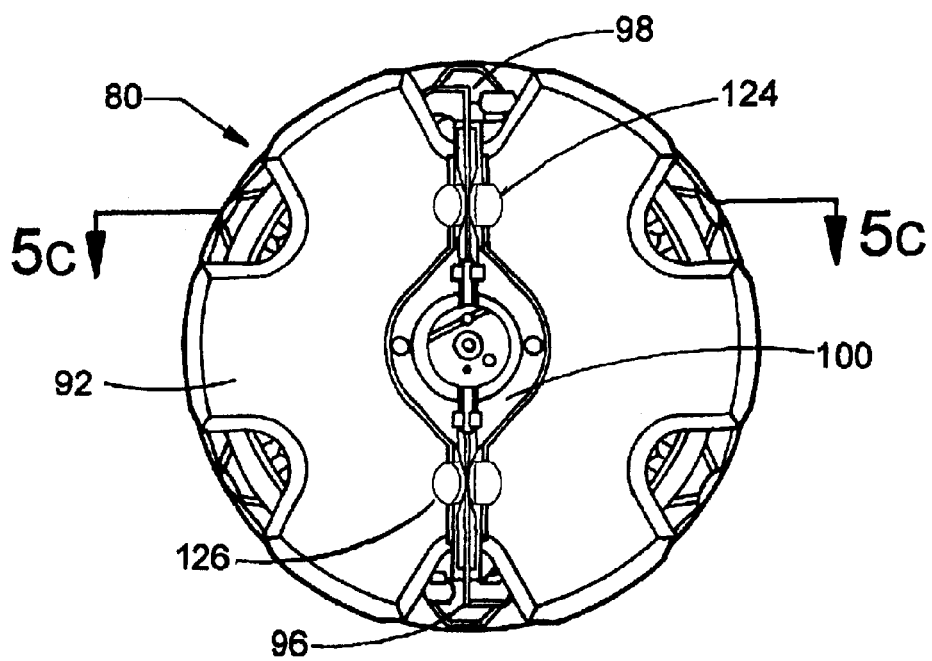
FIG. 5b is a plan view of the rotor assembly illustrating the start and end leads routed and welded to slip ring assembly, in accordance with the present invention.
Figure 5C:
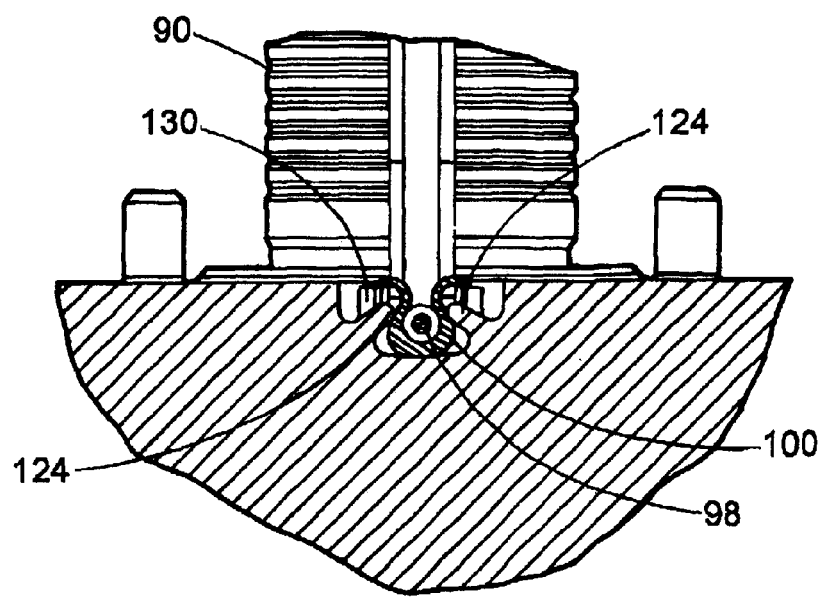
FIG. 5c is a magnified cross-sectional view through the rotor assembly at the location of the locking feature, in accordance with the present invention.

Finally, a locking feature 124 is created in outer surface 92 by swaging the outer surface. Locking feature 124, in one embodiment of the present invention, is a swage wherein claw pole material is displaced and forced against retainer 100 and leads 96 and 98. FIGS. 5b and 5c are top and cross-sectional views of rotor 80 and further illustrate locking feature 124, in accordance with the present invention. As illustrated in FIG. 5b, start and end leads 96 and 98 have been routed and welded to slip ring assembly 122. FIG. 5c is an exploded cross-sectional view through the rotor assembly 80 at the location of locking feature 124 on surface 92, as indicated in FIG. 5b. As illustrated, locking feature or swage 124 presses claw pole material against retainer 100 and field coil leads 96 and 98 locking the same within groove 94. Preferably, an epoxy 130 is deposited over field coil leads 96 and 98 and is captured by the locking feature or swage 124 and 126 as well as groove 94 and retainer routing channels 102 and 104. After the epoxy 130 cures, the geometry of the groove 94 and swage act to lock or retain the epoxy to the surface 92 of the claw pole.

Figure 6:
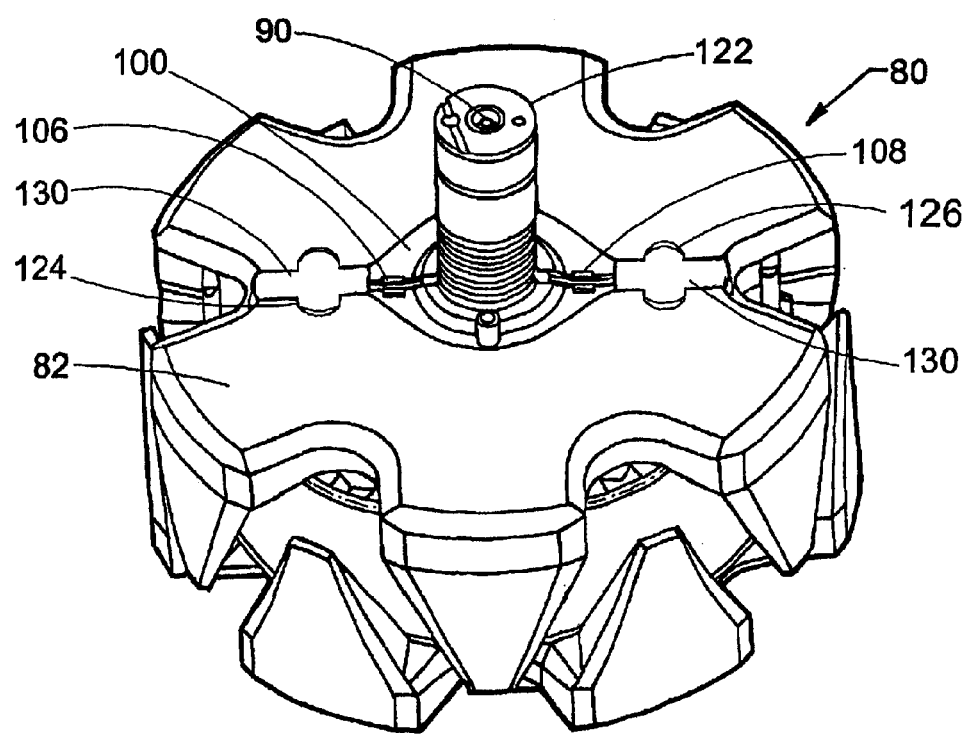
FIG. 6 is a top perspective view of the fully assembled improved rotor, in accordance with the present invention.

Referring now to FIG. 6, a fully assembled rotor 80 is illustrated, in accordance with the present invention. As shown, field coil leads 96 and 98 are retained against claw pole 82 (within groove 94). Advantageously, this retaining method eliminates manually staking the field coil leads before assembling to the slip rings. Thus, rotor assembly time and cost is reduced. Moreover, the rotor's high speed spin capability has been substantially improved.

The present invention further contemplates a method for assembling the new and improved rotor assembly. In a first step, a field coil assembly (including coil of magnet wire and bobbin) is inserted onto a hub of a pole piece. Next a second pole piece is assembled to the field coil. The start and end leads extend beyond an outer surface of the pole piece. A rotor shaft is then inserted through a bore in the pole piece. Next, a wire retainer is inserted over the rotor shaft and is placed in a wire retainer groove formed in the outer surface of the poles. The ends of the start and end leads are then covered by an insulating sleeve. This sleeve prevents the field current in the start and end leads from shorting to the rotor shaft. Next, the start and end leads are routed into a channel disposed in the wire retainer. The wire retainer includes features that retain the wire leads once the leads are placed in the retainer channel. A tool that is capable of displacing pole material is forced into the outer surface of the pole. This operation displaces pole metal into the start and end leads and the wire retainer groove. The resulting geometry produces a locking feature or swage that prevents axial or radial displacement of the lead wires. Further, an epoxy is deposited over the wire retainer groove covering the start and end leads and the wire retainer. The epoxy is held against the outer surface of the pole piece and is prevented from moving axially or radially by the locking feature. The wire retainer serves to provide an insulating barrier between the start and end leads and the pole. Moreover, the wire retainer includes thin sidewalls that are flexible and provide electrical insulation between the start and end leads and the secondary locking feature or swage. Finally, the epoxy is applied to the outer surface of the pole piece over the start and end leads and the wire retainer to permanently affix the leads to the outer surface of the pole piece.

As any person skilled in the art of electric machines having stators and rotors will recognize from the previous detailed description and from the figures and claims, modifications and changes can be made to the preferred embodiments of the invention without departing from the scope of this invention defined in the following claims.

What is claimed is:

1. An alternator for a motor vehicle, the alternator comprising:
    a stator having a stator winding;
    a rotor assembly positioned concentrically relative to the stator, the rotor assembly including:
        an at least one pole having a metallic outer surface, wherein the outer surface has a radially extending groove;
        a field coil disposed adjacent the at least one pole, the field coil having start and end reads;
        a slip ring assembly fixedly coupled to the start and end leads;
        a rotor shaft on which the field coil, the at least one pole and the slip ring assembly are fixed; and
        wherein the start and end leads are positioned within the groove and are retained in the groove by a swage formed in the metallic outer surface of the at least one pole.

2. The alternator of claim 1, further comprising a retainer disposed within the groove for retaining the start and end leads within the groove.

3. The alternator of claim 2, wherein the retainer has a snap feature for capturing the start and end leads.

4. The alternator of claim 2, further comprising an insulating sleeve disposed over the start and end leads.

5. The alternator of claim 4, wherein the insulating sleeve extends from the field coil to the retainer.

6. The alternator of claim 5, wherein the insulating sleeve extends from the retainer to the slip ring.

7. The alternator of claim 1 wherein the start and end leads are welded to the slip ring.

8. The alternator of claim 1 further comprising epoxy deposited over the start and end leads.

9. A rotor for an alternator, the rotor comprising:
    at least one pole having an outer surface, wherein the outer surface has a groove;
    a field coil disposed adjacent the at least one pole, the field coil having start and end leads;
    a slip ring fixedly coupled to the start and end leads;
    a rotor shaft on which the field coil, the at least one pore and the slip ring are fixed; and
    an insulating sleeve having a first and a second portion for covering the start and end leads, wherein the start and end leads are positioned within the groove in the outer surface of the at least one pole;
    a retainer positioned within the groove for retaining the start and end leads within the groove; and
    a swage formed in the outer surface of the at least one pole piece for securing the retainer in the groove.

10. The rotor of claim 9, wherein the retainer has a snap feature for capturing the start and end leads.

11. The rotor of claim 9, wherein the first portion of the insulating sleeve extends from the field coil to the retainer.

12. The rotor of claim 11, wherein the second portion of the insulating sleeve extends from the retainer to the slip ring.

13. The rotor of claim 9, further comprising an epoxy deposited over the start and end leads.

14. The rotor of claim 9, wherein the start and end leads are welded to the slip ring assembly.

15. An alternator for a motor vehicle, the alternator comprising:
    a stator having a stator winding; and
    a rotor assembly positioned concentrically relative to the stator, the rotor assembly including:
        an at least one pole having an outer surface, wherein the outer surface has a groove;
        a field coil disposed adjacent the at least one pole, the field coil having start and end leads disposed within the groove;
        a slip ring fixedly coupled to the start and end leads;
        a rotor shaft on which the field coil, the at least one pole and the slip ring assembly are fixed;
        an insulating sleeve covering the start and end leads; and
        a pair of swages formed in the outer surface at the at least one pole for retaining the start and end leads.

16. The alternator of claim 15, further comprising a retainer disposed within the groove for retaining the start and end leads within the groove.

17. The alternator of claim 16, wherein the retainer has a snap feature for capturing the start and end leads.

18. The alternator of claim 15, wherein the insulating sleeve extends from the field coil to the retainer.

19. The alternator of claim 15, wherein the insulating sleeve extends from the retainer to the slip ring.

20. The alternator of claim 15, wherein the locking feature is a swage formed in the outer surface of the at least one pole.

21. A method for routing start and end leads of a field coil of a rotor, the method comprising:
    routing the start and end leads of the field coil in a radially extending groove in a metallic surface of a pole of the rotor; and
    deforming the metallic surface of the pole of the rotor to form a swage feature thereby capturing the start and end leads in the groove.

22. The method of claim 21 further comprising placing insulating sleeves over the start and end leads of the field coil.

23. The method of claim 21 further comprising routing the start and end leads through a retainer disposed in the groove.

24. The method of claim 21 further comprising applying an epoxy on the start and end leads.

25. The method of claim 21 further comprising welding start and end leads to a slip ring assembly attached to the rotor.

* * * * *

UNITED STATES PATENT AND TRADEMARK OFFICE
CERTIFICATE OF CORRECTION

PATENT NO. : 6,847,138 B2
DATED : January 25, 2005
INVENTOR(S) : Michael T. York et al.

It is certified that error appears in the above-identified patent and that said Letters Patent is hereby corrected as shown below:

Column 5,
Line 10, after "and end" delete "reads;" and substitute -- leads; -- in its place.

Signed and Sealed this

Twenty-third Day of August, 2005

JON W. DUDAS
*Director of the United States Patent and Trademark Office*